Nov. 3, 1964  H. KLENK  3,155,135
TREAD STRUCTURE FOR PNEUMATIC VEHICLE TIRES
Filed Jan. 10, 1963
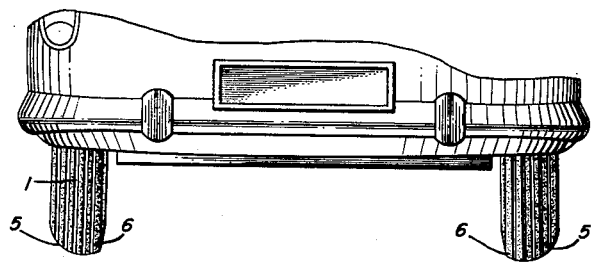
FIG.1
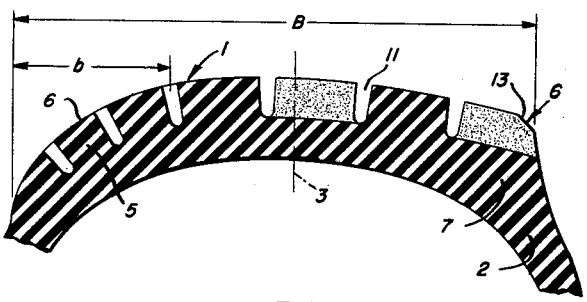
FIG.2
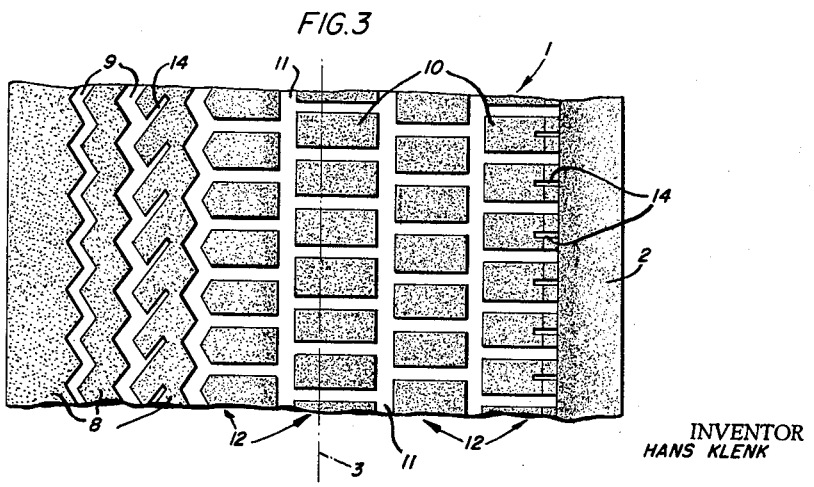
INVENTOR
HANS KLENK

United States Patent Office 3,155,135
Patented Nov. 3, 1964

3,155,135
TREAD STRUCTURE FOR PNEUMATIC
VEHICLE TIRES
Hans Klenk, Hannover, Germany, assignor to Continental
Gummi-Werke Aktiengesellschaft, Hannover, Germany
Filed Jan. 10, 1963, Ser. No. 250,537
Claims priority, application Germany, Jan. 13, 1962,
C 25,992; Apr. 13, 1962, C 26,742
4 Claims. (Cl. 152—353)

The present invention relates to a tread structure for pneumatic vehicle tires of double-track street vehicles.

With pneumatic tires for such purposes, it is known to round either both tire shoulders or to design both shoulders with relatively sharp edges having a relatively small radius of curvature only.

It is also known in connection with tires of the above-mentioned type to provide the tread strip with circumferential ribs and with rows of blocks, i.e. with rows of blocks, ribs or the like, which blocks, ribs or the like follow each other in circumferential direction. In this connection, the circumferential ribs serve primarily for maintaining the track, whereas the rows of blocks or the blocks, ribs or the like are intended to assure the drive when the road is relatively soft as, for instance, is snow-covered.

It is therefore an object of the present invention to provide a tread structure for vehicle tires of double-track street vehicles which will improve the driving through curves.

It is another object of this invention to provide a tread structure as set forth in the preceding paragraph, which will improve the lateral guiding of the vehicle and reduce the sensitivity of the tires against influence by depressions and elevations in the road, and particularly rails and the like.

These and other objects and advantages of the invention will appear more clearly from the following specification in connection with the accompanying drawings, in which:

FIGURE 1 illustrates a rear view of a vehicle equipped with a set of tires according to the present invention;

FIGURE 2 illustrates a radial partial section through a vehicle tire according to the present invention;

FIGURE 3 is a top view of FIGURE 2.

The tire according to the present invention is characterized primarily in that that shoulder of the tire which, when the tire is mounted on the vehicle is located on the outside of the vehicle, is rounded considerably more than the other shoulder of the tire.

In conformity with a further feature of the invention, the circumferential ribs are adjacent the considerably stronger rounded shoulder, whereas the blocks and the ribs formed thereby form the remaining portion of the tread area. This tread strip structure is asymmetric with regard to that central tread plane which is perpendicular to the axis of rotation of the tire. In addition thereto, the design of the tread is also asymmetrical with regard to said central tread plane inasmuch as the tread design on one side of said central tread plane is different from the tread design on the other side of said central tread plane.

The present invention is based on the finding according to the invention that the advantageous effects of a highly rounded tire shoulder become particularly obvious when high lateral forces are encountered, for instance, in sharp curves, when driving over troughs, rails or the like extending in the driving direction. Under the just-mentioned circumstances, the other tire shoulders (when looking from the interior of the vehicle) are decisive for the behavior of the tire. This applies above all to driving through a curve when the weight of the vehicle shifts laterally toward the outside while placing an increased load on the outerwardly located tires or tire portions. It is at this time that the outwardly located rounded tire shoulder becomes effective. The tire will be able to deform and, so-to-speak, a situation will occur in which the shoulder will properly roll and contact the ground along its rounded area.

During normal driving conditions, the highly rounded tire shoulder is of less importance. The effective width of the tread surface is determined by the load on the axle of the tire, i.e. by the depression imparted upon the tire.. If the tire shoulder located on the opposite side of the highly rounded tire shoulder is considerably less rounded or has only relatively sharp edges, a relatively wide contacting surface of the tread area will be obtained. In these circumstances, the tire will have the advantageous properties of a rounded shoulder tire with the additional advantage of the obtainment of a relatively wide ground contacting surface.

The highly rounded tire shoulder may be provided with tread designs of various known types. Preferably, however, the highly rounded shoulder is formed by circumferential ribs which may be subdivided by fine gaps extended transversely or at an incline with regard to the circumferential central plane of the tire.

According to a further development of the present invention, that portion of the tire tread surface which does not form the rounded shoulder may be provided with a block profile similar to the tread design of snow-tires. The block profile may be of any desired type but preferably, two or more block rows are employed in which the blocks following each other in circumferential direction have a flat rectangular contour and are arranged so as to extend in a direction transverse to the circumferential direction, as is well known in connection with snow-tires. If desired, fine gaps or cuts in the circumferential ribs of the rounded tire shoulder as well as in said blocks, may be provided.

Referring now to the drawings in detail and FIGS. 2 and 3 thereof in particular, the tire body 2 illustrated in FIG. 2 has its tread surface 1 arranged asymmmertcially with regard to the central plane of symmetry 3. The tire is so mounted on the rim that when looking from the interior of the vehicle, the outwardly located tire shoulder 5 (left-hand side of FIG. 1) is highly rounded, as indicated by reference numeral 5, whereas the oppositely located shoulder 7 meets with the adjacent tire side wall along an edge 6 which for all practical purposes may be termed sharp-edged, even though a slight chamfer 13 may be provided.

As will furthermore be evident from FIGS. 1 and 2, the arrangement is such that when the tire is mounted, that tire shoulder 5 which, when looking from the inside of the vehicle is located on the outside, has a considerably stronger rounding 6 than the oppositely located shoulder 1. The rounded shoulder 5 as shown in FIG. 2 comprises three circumferential ribs 8a which are separated from each other by circumferential zigzag grooves 9. It is, however, to be understood that also more than three circumferential ribs 8a, may be selected. The profile of the rounded shoulder 5 covers a width b which in the particular arrangement shown in FIGS. 2 and 3 amounts to approximately one-fourth of the overall width B of the tread surface 1. The remaining portion of the tread surface 1 comprises blocks 10. According to the specific design shown in FIGS. 2 and 3, four blocks are arranged adjacent each other in the direction of the width of the tire and are separated from each other by grooves 11. These blocks 10 have a rectangular contour and have their longitudinal extension extending in the transverse direction of the tire. The blocks 10 of the outermost row 12 may, as indicated at 13, be slightly phased or chamfered or slightly rounded. As emphasized above, it is essential that the shoulder portion 5' be considerably more strongly rounded than the oppositely located shoulder.

If desired, the blocks 10 and also the circumferential ribs 8a may be provided with fine cuts, as indicated by the reference numeral 14.

It is furthermore to be noted that the relationship of the width $b : B$ may vary in conformity with the specific design of the tire and may amount, for instance, to 1:4 or 1:2. In the last-mentioned instance, of course, the effect of the block profile would be less than in the first-mentioned instance. On the other hand, it is also possible to reduce the width $b$ over that shown in FIGS. 2 and 3 so that the relationship $b$ to $B$ may amount to 1:6, if the tire is to be employed primarily as snow-tire.

Attention may also be directed to a further asymmetry of the blocks in both embodiments across the width of the tire. Thus, it will be seen from the drawings that the width of the ribs 8 in FIG. 3 varies in the direction of the width of the tire body 2 and similarly also the blocks 10 vary in their length. Also, the width of the circumferential ribs in the rounded shoulder portion may vary, as shown in the drawings, in the direction of the width of the tire.

As will be evident from the above, a tire according to the present invention is highly advantageous inasmuch as is greatly facilitates the passing over trough-like depressions in the road as, for instance, streetcar rails. On the other hand, the well-known advantageous properties of a block profile are retained. Also, the grip of the tire is assured. The self-cleaning of the block profile is not disturbed by the circumferential ribs in the highly rounded shoulder because said ribs are located solely on one side of the tread surface. Of particular importance furthermore is the fact that the danger of zig-zag-shaped wear of the blocks of the tread strip will be prevented by the ribs within the range of the highly rounded tire shoulder, or will at least be greatly reduced.

It is, of course, to be understood that the present invention is by no means limited to the particular embodiments referred to above but also comprises any modifications within the scope of the appended claims.

What I claim is:

1. A tread structure having a profiled tread surface and having its shoulders so designed that at one shoulder the tread surface gradually merges with the adjacent side wall of the tire along a curve, whereas at the other shoulder the tread surface relatively sharply merges with the adjacent side wall of the tire, said tread surface comprising circumferentially extending tread ribs adjacent said one shoulder, and also comprising block-shaped tread sections arranged in a plurality of circumferential rows having their longitudinal extension in a direction transverse to the direction of rotation of said tire, the block-shaped tread sections of one row being offset in circumferential direction of said row with regard to the adjacent row of block-shaped tread sections.

2. A tread structure having a profiled tread surface and having its shoulders so designed that at one shoulder the tread surface gradually merges with the adjacent side wall of the tire along a curve whereas at the other shoulder the tread surface meets with the adjacent side wall of the tire along a relatively sharp edge having a diameter less than the diameter of the tire along its circumferential zenith portion when the tire is under no load, said tread surface comprising circumferentially extending tread ribs distributed over said one shoulder and separated from each other by circumferential grooves, the width of said ribs being a multiple of the width of said grooves, and the remainder of said tread surface comprising block shaped tread sections separated from each other in the circumferential direction of the tire by grooves.

3. A tread structure according to claim 2, in which said block shaped tread sections have a rectangular contour with their longitudinal extension in the direction transverse to the direction of rotation of said tire.

4. In combination: a vehicle having two axially aligned tire equipped wheels, each of said tires having a tread structure with a profiled tread surface so designed that at one shoulder the tread surface gradually merges with the adjacent side wall of the tire along a groove whereas at the other shoulder the tread surface meets with the adjacent tire side wall along a relatively sharp edge having a diameter less than the diameter of the tire along its circumferential zenith portion when the tire is under no load, said tread surface comprising circumferentially extending tread ribs distributed over said one shoulder and separated from each other by circumferential grooves, the width of said ribs being a multiple of the width of said grooves, and the remainder of said tread surface comprising block shaped tread sections separated from each other in the circumferential direction of the tire by grooves, the tire of said two wheels being mounted in such a manner that those side walls of said two tires which meet with the respective adjacent tread surface along the relatively sharp edge face each other.

References Cited in the file of this patent

UNITED STATES PATENTS

| 2,154,290 | Snyder | Apr. 11, 1939 |
| 2,960,138 | Chiodo | Nov. 15, 1960 |
| 3,094,157 | Klohn | June 18, 1963 |

FOREIGN PATENTS

| 38,887 | Norway | Nov. 10, 1924 |